Patented Mar. 4, 1952

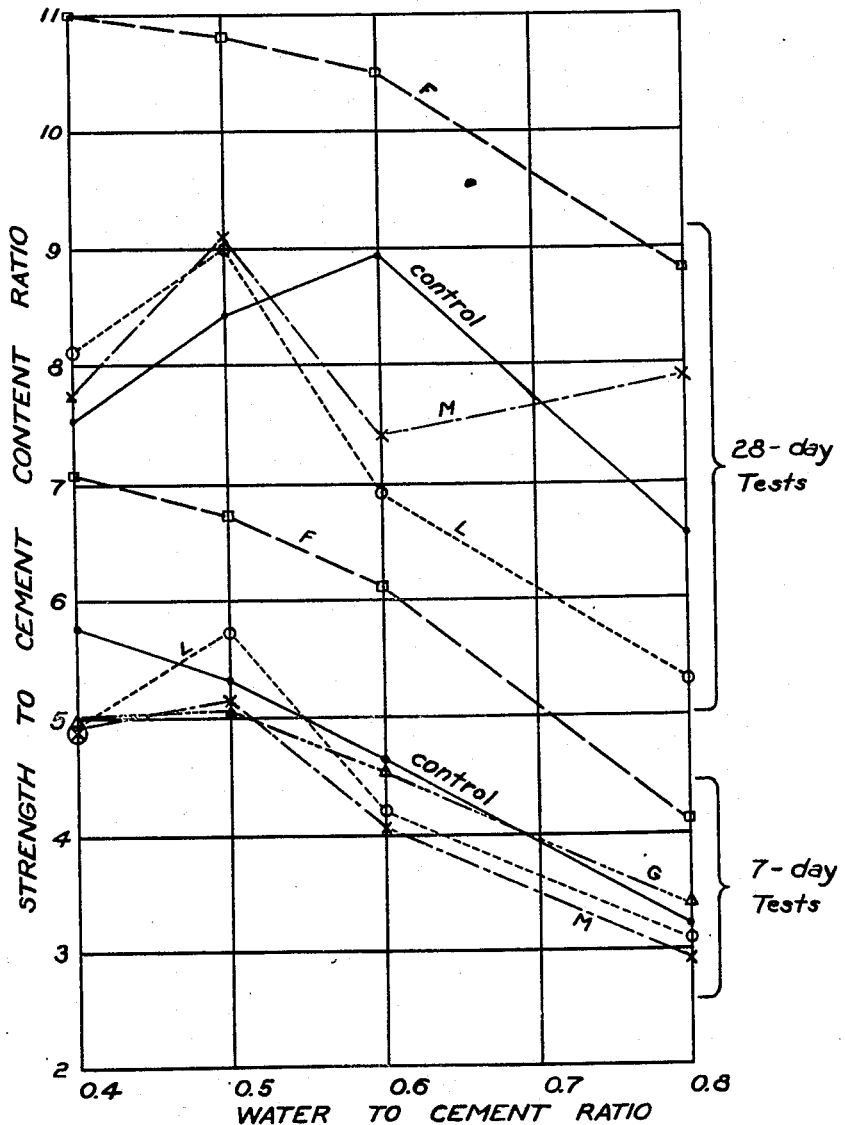

2,588,248

UNITED STATES PATENT OFFICE 2,588,248

HYDRAULIC CEMENTITIOUS MIXTURES AND METHOD OF MAKING

Alexander Klein, Berkeley, Calif., assignor to Louis S. Wertz, Cleveland, Ohio

Application November 8, 1948, Serial No. 59,013

27 Claims. (Cl. 106—90)

1

This invention relates to concrete, mortar, grout, and the like, herein for brevity generically referred to "hydraulic cementitious mixtures." More particularly, this invention is concerned with a method for modifying the properties of such mixtures by the use of admixtures, and with improved compositions containing such admixtures.

Hydraulic cementitious mixtures may, for the present purposes, be defined as mixtures comprising essentially a hydraulic cement, aggregate and water, having the property of setting to form a hardened mass. Such mixtures may contain any hydraulic cement, such as Portland cement or blends of Portland cement and such materials in finely divided form as natural cement, water quenched blast furnace slag, and pozzolanic materials, e. g., volcanic ash, fly ash, kieselguhr or diatomaceous earth, etc.; they may contain mineral or non-mineral aggregates or mixtures thereof. Of particular interest among the various mixtures with which the invention is concerned are concretes and grouts; in the former cement, water and aggregate, including coarse materials, are mixed together prior to being molded or otherwise emplaced; in grouts, on the other hand, are mixtures consisting mainly of cement, water, and sand of small size, which can be pumped through pipe lines and of such fluidity that they can be readily forced into small spaces, such as voids and cracks of a porous or honeycombed concrete mass or into the interstices of preplaced aggregate. Fluidity is important to permit the grout to be forced into the more remote portions of an enclosed space which was previously filled with aggregate.

The use of admixtures to modify certain properties of concrete, grout, mortar, and the like in such a way as to make it more suitable for the work in hand is already well recognized in the art. The term "admixture" may be defined as any substance, other than aggregate, water, or the cement used as the binding material, that is used as an ingredient for cementitious mixtures. Admixtures have been classified into several groups according to the type of materials constituting the admixtures, or to the characteristic effects of their use. (See Admixtures for Concrete, A Report by ACI Committee 212, J. Amer. Concrete Institute, vol. 16, No. 2, November 1944.)

Of major importance in the art is the problem of forming hydraulic cementitious mixtures of proper consistency, plasticity or workability without either incurring the cost of using an unduly large proportion of cement or making a sacrifice to strength and other properties by using an excessive amount of water. Consistency of concrete and mortars is commonly measured by determining the slump or the flow. Workability and consistency are both determined by measuring the remolding effort. The consistency of highly fluid cementitious mixtures, such as grouts, is often measured by determining the consistency factor, i. e., the angle of twist in degrees of a paddle suspended from a torsion wire within a pan of fresh grout which pan is rotated at a constant speed, normally 60 R. P. M. The consistency factor increases as the fluidity of the grout decreases. Workability and fluidity are improved by increasing the plasticity. As is well known, the strength and weathering resistance of the final, hardened mass tends to decrease, and the shrinkage due to drying tends to increase as the ratio of water to cement in the wet or fresh mixture is increased, and various admixtures have been proposed and tested for improving the plasticity and permitting the use of a smaller proportion of water. If a hydraulic cementitious mixture can be rendered more plastic or workable by the use of such an admixture without concomitantly adversely affecting the strength and other desirable properties, it becomes possible, for a given, desired workability, to effect certain economies, for example, by using a smaller proportion of water, yielding a final, hardened product of increased strength, weathering resistance, etc.; or, by using less cement (or less cement and less water), yielding a product of the same strength and other properties. Most significant among the known admixtures for this purpose are the so-called air-entraining agents and the water-reducing agents; the former and some of the latter cause the entrainment of air which, concomitantly, increases the plasticity and weathering resistance. These known admixtures which entrain air, however, usually bring about no significant economies in the relationship between the cement content and the strength because entrained air by itself inherently weakens the concrete just as does an excess of mixing water, and hence, produces a concrete of decreased strength; air entrainment may actually require an increase in the cement content to compensate for this strength decrease. Usually, the use of such admixtures for the entrainment of air in excess of about 3 percent by volume of the fresh concrete leads to a significant reduction in strength, thereby limiting their use for improving plasticity, workability and weathering resistance where strength is an item of importance.

It is more or less axiomatic in the field of concrete technology that increase in air content above about 3 percent results in decrease in 28-day compressive strengths equivalent to about 200 lbs. per sq. inch for each percent of air because of the weakening effect of admixtures, for the reasons stated above.

The air content of fresh concrete is determined by various methods, the two most common being the gravimetric method (commonly accepted as the more reliable and standardized by the A. S. T. M.), and the faster pressure method, wherein the contraction of the fresh concrete resulting from the application of observed pressure is measured. Results by the pressure method are somewhat higher in most instances when small air concentrations, e. g., of the order of 3 percent and less, are involved, but similar results are obtained at higher air concentrations. Data presented in this specification are, unless otherwise noted, based on the gravimetric method.

Air entrainment was formerly in disfavor, but is now regarded as desirable, not only because of improvement in plasticity, but more particularly because the weathering resistance or durability of the hardened concrete, i.e., its resistance to freezing and thawing, is enhanced thereby. While from 3 to 4 percent of air is generally regarded as adequate for achieving good durability, additional improvement is generally attained by a higher air content. Moreover, a higher air content improves workability of lean or harsh mixes, decreases bleeding or water gain, and increases the yield of concrete for a given amount of ingredients. It would, therefore, be highly advantageous, at least for certain purposes, to produce hydraulic cementitious mixtures with appreciably higher air contents if this could be achieved without adversely affecting strength and other properties.

It is also known to use finely divided kieselguhr or diatomite, herein referred to as diatomaceous earth, as an ingredient of hydraulic cementitious mixtures, such as grouts, mortar and concretes of which the principal cementing medium is Portland cement. For many years it has been recognized that such additions in the order of 2 to 3 percent of the weight of the cement could be employed with benefit to the mixture as regards plasticity, water gain, and homogeneity, without materially affecting the strength, drying shrinkage and other important properties of the hardened grout, mortar or concrete. It has also been known that diatomaceous earth is an exceedingly active pozzolanic material, capable of rapidly combining with the calcium hydroxide liberated during the process of hydration of the Portland cement to produce compounds which contributed to strength, impermeability and resistance to aggressive waters. However, it was found that the natural diatomaceous earth could not be used as an addition or as a cement replacement in amounts substantially greater than 2 or 3 percent without greatly increasing the water requirement to produce a freshly mixed grout, mortar, or concrete of required consistency and without producing a hardened product of lower strength, greatly increased drying shrinkage and tendency toward cracking, and substantially reduced resistance to freezing and thawing. It is an object of the present invention to improve the workability and/or decrease the water requirement of hydraulic cementitious mixtures by incorporating therein an admixture which will favorably affect the important or significant properties of the final, hardened mass, viz., which will inherently increase the homogeneity and/or strength and/or weathering resistance and/or water tightness and/or other characteristics.

Another object is substantially to reduce the cement content of cementitious mixtures without sacrifice of strength and weathering resistance and, at the same time, decrease the temperature rise of the hardening mass and the drying shrinkage of the hardened mass, thereby greatly reducing the tendency toward cracking.

A further object is to improve the workability and weathering resistance of hydraulic cementitious mixtures by incorporating therein an admixture which will entrain air and which may be used economically either in concentrations for entraining the usual amounts of air, e. g., 2.5 to 4 percent, or in concentrations sufficient to entrain larger amounts of air than was economically practical with prior air entraining agents, e. g., above about 4 percent, such as 5 to 7 percent. Another object is to improve the properties of hydraulic cementitious mixtures by the use of an improved admixture which will cause increased strength with increasing air entrainment up to an air concentration of the order of 5 to 7 percent, as distinguished from prior admixtures wherein strength is decreased with an increase in air entrainment.

A further object is to provide an improved method for treating hydraulic cementitious mixtures by incorporating therein an air-entraining agent, such as a commonly used or conventional air-entraining agent, together with an improved admixture which renders such air-entraining agent more effective than when used alone, and which counteracts the inherent strength-decreasing characteristics of such air-entraining agent, or which improves the strength of the final hardened mass. Ancillary thereto, it is an object to provide an improved hydraulic cementitious mixture containing an improved admixture which entrains air and/or promotes the air-entraining characteristics of other air-entraining agents employed together therewith.

Another specific object is to improve certain properties or characteristics of fresh, unhardened cementitious mixtures containing pozzolanic materials, such as diatomaceous earth, particularly the characteristics relating to plasticity, workability, ability to hold solid constituents in suspension so as to prevent segregation during the operations of transporting and placing, and ability to retain the mixing water so that objectionable quantities thereof will not rise to the surface and will not collect on the underside of pieces of aggregate which are incorporated in the mixture. Ancillary thereto, it is an object to permit the use of diatomaceous earth in cementitious mixtures in amounts substantially greater than 2 or 3 percent, e. g., up to 20 percent, without incurring objectionable increased water requirement, lower strength, increased drying shrinkage, tendency toward shrinking, and reduced resistance to freezing and thawing, or wherein such consequences are manifested to a markedly smaller degree.

A further object is to improve such properties of hardened cementitious mixtures of given Portland cement content and containing diatomaceous earth, such as: compressive and flexural strengths; resistance to freezing and thawing; resistance to cracking due to drying shrinkage; resistance to the action of aggressive ground waters and to sea water; bond to adjacent masses such as foundation rock and old concrete, and to steel reinforcement. A related object is to produce a concrete which, after hardening, will not exhibit excessive expansion when the aggregates employed therein contain reactive minerals which, with a high alkali Portland cement, would otherwise produce such expansion.

Still another object of the invention is to produce concretes which may be placed under water, by methods customarily employed, with less tendency toward segregation and with a smaller proportion of cement than is customarily used for such work.

By the use of this invention, significant economies may be effected depending upon the requirements of the work in hand, and the invention is not limited to any specific mode of effecting such economies. For example, it is possible to produce a cementitious mixture yielding a hardened mass of given properties, such as strength, durability, volume constancy, etc., and having a given consistency, remolding effort, or flow, with a significantly smaller quantity of cement; alternatively, the strength, durability, volume constancy, etc., of the hardened mass may be materially enhanced and/or the workability of the fresh mixture greatly improved while using the same cement content as would be required without the novel admixtures of this invention or by the use of conventional admixtures.

Briefly, according to the instant invention, the properties of hydraulic cementitious mixtures are improved by incorporating therein a small proportion, usually between about 0.005 percent and 0.6 percent, based on the weight of cement, of a reaction product of a polyhydroxy carboxylic acid with a nitrogen base, either alone or together with other admixtures, such as air-entraining agents, accelerators, retarders, etc. Amounts above 0.6 percent, while not preferred, are not known to be harmful.

It was found that hydraulic cementitious mixtures treated in this manner have significantly reduced water-cement ratios and yield hardened masses of improved permanent properties. Specifically, when a wet or unset mixture of a given consistency or workability is desired, it was found that these organic reaction products significantly reduce the water requirements of mortar, grout, concrete, and the like, while at the same time increasing the strength of the final, hardened mass. From another point of view, these reaction products, when used as admixtures, materially increase the plasticity of the hydraulic cementitious mixtures of given water content, rendering them more suitable for molding and working and significantly improve the strength of the hardened product at all ages. Such improved workability and increased strength for a given water content and equal air content of the mass is unattainable either through increasing the cement content or through the use of known or conventional admixtures.

Moreover, it was found that these organic reaction products, when employed as admixtures, entrain minute globules of air which, aside from improving the plasticity as previously described, impart to the final, hardened mass increased resistance to freezing and thawing, a property herein referred to as durability or weathering resistance. A remarkable characteristic of these reaction products is their capacity, when used with less than the usual amount of air-entraining agents, to produce concretes, of air contents substantially greater than 3 percent, of significantly higher strengths at all ages than those of corresponding concretes without admixture and containing entrained air.

As was noted previously, for a given admixture of the conventional types, an increase in air entrainment brought about by progressively larger concentrations of the same admixture is usually accompanied by a decrease in concrete strength. It is possible, in certain cases, to increase the early strength of concrete containing conventional types of air-entraining agents by adding an accelerator, such as $CaCl_2$, particularly where the cementitious mixture has a low strength; but to effect an increase in the strength of a concrete which already has a strength higher than that of the blank ((i. e., of the control without any admixture) by adding a greater quantity of the same air-entraining agent would generally be regarded as remarkable. However, it was found that the organic reaction products according to this invention cause increasing strengths with increased concentrations and increased air entrainment up to certain limits extending above 3 percent, not only at the early ages but also at later ages.

Moreover, these organic reaction products effect improvements in certain other properties of the resulting, hardened mass, such as volume constancy or reduced drying shrinkage.

Another highly important feature of the invention is the use of the organic reaction products as admixtures together with other air-entraining agents, such as the well-known Vinsol resin (a commercial product consisting essentially of resins and described in U. S. Patents No. 2,225,149 and No. 2,225,150) and Darex (a commercial product consisting essentially of sulphonated hydrocarbons); saponifiable resins, fats and oils which, although in themselves foaming agents, undergo a saponification reaction with the alkali constituents of the cement for the development of foaming or foam-stabilizing property; and alkali-metal salts of sulphonated oils or fatty acids. Air-entraining agents of any type, including those enumerated above (and including those which develop air-entraining or foam-stabilizing properties only after admixture with hydraulic cement) may be added, either together with the organic reaction products or separately, and either during the mixing process or prior thereto, e. g., by grinding or otherwise incorporating the air-entraining agent into the dry cement.

This feature of the invention is based on the property of the organic reaction products of aiding the action of the air-entraining agents while counteracting the tendency of such agents to weaken the final, hardened mass; this weakening tendency is counteracted to the extent that the final strength is actually increased. As will be evident from the following examples, the organic reaction products according to the invention, even though in certain instances capable of entraining only minor amounts of air when used alone in usual or small concentrations, significantly improve the action of other air-entraining agents in entraining air and/or improving the workability or fluidity of the wet mixture, leading to the improved results described in the foregoing paragraphs. Thus, while many of the known or conventional air-entraining agents, when used alone, cannot be employed for the entrainment of air in amounts greater than about 3 to 4 percent without sacrifice of strength, it is possible and entirely feasible economically to entrain more than this amount of air, e. g., up to 5 to 7 percent by volume or even higher, by employing such air-entraining agents in small amounts together with the organic reaction products according to the invention.

The organic reaction products may be added to the hydraulic cementitious mixture in any suitable manner, e. g., separately, or together with one or several of its main ingredients, care being taken to insure proper mixing. The reaction products in dry form may be added to the dry cement or to a small portion thereof with which it may be intimately mixed to obtain better dispersion through the final mixture. It may also be added to cement and sand to produce a useful composition which when subsequently mixed with water produces a grout of excellent fluidity which can be readily forced under pressure into voids and interstices between masses of earth, rock, preplaced aggregate, and the like. In most cases, liquid reaction products are used and it is, in such cases, preferable to add them to the mixing water, or to form a solution thereof with a part of the mixing water and then combine the solution with the remainder of the water or add it directly to the cementitious mixture.

The organic reaction products according to the present invention are particularly valuable as admixtures for cementitious mixtures containing pozzolanic material such as diatomaceous earth as an ingredient, either as a replacement of Portland cement or in addition to a specified quantity of cement. The admixture may be added according to any of the techniques described heretofore, or with the diatomaceous earth. Excellent results are obtained by treating diatomaceous earth with the admixture either in dry form or in solution, for example, during the grinding process. The organic reaction product may be added to the diatomaceous earth either alone or together with another air-entraining agent of the type hereinbefore mentioned. It is preferred to treat the earth with an aqueous solution of the admixture (with or without another air-entraining agent) in a small amount so that uniform dispersion results and the earth is left palpably dry. After grinding treatment, the resulting product is an exceedingly fine powder, several times as fine as ordinary Portland cement, and has a specific gravity of about two-thirds of that of Portland cement. The chemically treated diatomaceous earth may then be stored in the dry state and used in hydraulic mixture when needed. The concentration of the admixture in the diatomaceous earth will depend upon the proportion of earth to be used in the mixture and the desired amount of air-entrainment, and may, for example, be such as to result in an ultimate concentration of the admixture within the range of concentrations previously stated. For example, if diatomaceous earth is to be used in an amount equivalent to 10 percent by weight of the Portland cement, from 1 to 2 percent by weight of the admixture may be used in treating the diatomaceous earth for producing a final concentration of the admixture in the cementitious mixture of 0.1 to 0.2 percent based on the Portland cement. The chemically treated diatomite may be added to the other ingredients of the mixture at the time of mixing, or may be interground with or blended with the Portland cement at the time of its manufacture. The former practice is preferred since it makes possible closer control of mix design to secure desired properties.

From extensive tests it was found that concretes containing natural diatomite replacements for Portland cement as high as 12 percent, to which there had been added any one of several of the commonly employed air-entraining agents in amounts sufficient to entrain 3 to 6 percent of air, were of somewhat higher resistance to freezing and thawing than those of corresponding concretes without diatomite, and it was found that the resistance to freezing and thawing was much greater for 6 percent entrained air than for 3 percent. At the same time, it was found that the higher air content substantially reduced the strength and that any of the several air-entraining agents, used in whatever amount, substantially increased the drying shrinkage and the tendency toward cracking of hardened concrete due to such shrinkage. It was also found that when the commonly known water-reducing agents were employed without air-entraining agent, while a reduction in the water necessary to produce a required consistency was effected, and in some instances the strength of concrete was somewhat increased, the resistance to freezing and thawing was but slightly improved, the drying shrinkage was generally greater in spite of the lower water content, and in no case was the water requirement for the larger replacements of diatomite as low as that of a corresponding Portland-cement concrete without wetting agent.

However, by the use of the organic reaction products according to the invention it was found that these drawbacks are obviated and that it is possible to use larger porportions of diatomaceous earth, e. g., from 2 to 20 percent, with increased air entrainment and a lower shrinkage due to drying. In practice, the amount of treated or untreated diatomaceous earth to be employed will depend upon a number of factors, such as the type of the construction, environment of the structure, cement content, grading of the aggregate, etc. For concrete mixes where strength, weathering resistance, and small volume change are items of importance, quality is enhanced and greatest economy is effected by employing the earth in amounts up to 10 percent of the weight of the cement, or about 15 percent of the solid volume, with entrained air amounting to about 5 percent of the volume of the concrete. Through the use of such an amount of diatomite it becomes possible to reduce the Portland cement content as much as one sack (94 pounds) per cubic yard of concrete without sacrifice of strength, resistance to freezing and thawing, watertightness, and with improvement in homogeneity and volume constancy.

Where low strengths are permissible and volume constancy and low temperature rise due to hydration are desirable, as in mass structures such as dams, the use of diatomaceous earth in amounts as great as 15 to 20 percent of the weight of the cement makes it possible to produce concretes of the requisite workability and freedom from water gain and segregation, for which the cement content may be as low as two sacks per cubic yard or about two-thirds of that which is considered to be the minimum requirement when straight Portland cement is employed. Also, where reactive aggregates are encountered, it has been found that excessive expansion of concrete may be prevented by the use of diatomite in the order of 10 to 15 percent of the weight of the Portland cement, even when the latter is relatively high in the alkalies, sodium oxide and potassium oxide; and the resistance of concrete to sulphate waters, such as are encountered in some ground waters, and to sea water is greatly increased through the use of diatomite in the amount of 12 to 15 percent of the weight of the cement.

By the use of the admixtures according to the invention it is possible to use pozzolanic materials, such as diatomaceous earth in amounts greater than was previously practicable, with entrainment of 3 percent to 6 percent of air in the concrete, producing a mixture which, for a like workability, has a greater plasticity, a lower water content, a lower water gain, less segregation, a greater strength, greater impermeability, a greater resistance to freezing and thawing and to the action of sulphate water, and a lower shrinkage due to drying than a corresponding mixture containing Portland cement without admixture of any kind.

The admixtures according to the invention are reaction products of a polyhydroxy carboxylic acid and a nitrogen base. They are believed to be amine salts, but it is not desired to restrict the invention by any theory advanced regarding the chemical reaction invloved in their formation. In some instances it was found that these reaction products can be rendered more effective as air-entraining agents by heating to drive off water, leading possibly to the formation of amides or to other chemical changes.

Of the polyhydroxy acids, those having from 4 through 18 carbon atoms and having a terminal carboxyl group are preferred. Such polyhydroxy acids are exemplified by gluconic acid, tartaric acid, citric acid, saccharic acid, trihydroxy glutaric acid, arabonic acid, suberic acid, tetrahydroxy adipic acid, and poly-hydroxy, e. g., tetrahydroxy palmitic or oleic acid. Aliphatic carboxylic acids of this class having a hydroxyl group on each carbon atom of the aliphatic chain, e. g., gluconic acid, are particularly useful.

Suitable nitrogen bases which are reacted with the polyhydroxy acids to result in the desired admixtures comprise, for examples: ammonia, the mono- or poly-aliphatic, aralkyl, carbocylic and heterocyclic amines, whether of primary, secondary or tertiary character, as butyr-amine, diisopropyl amine, methyl ethyl amine, trimethyl amine, the hexyl and/or cetyl amines, diethyl aniline, diethylbenzilamine, cyclo-hexylamine, 2-amino-pyridine, ethylene diamine, phenylene diamine, benzidine, etc.; amides, as acetamide, the mixed amides of vegetable and animal oils, fats and waxes, as those of coconut oil, sardine oil, castor oil, soya bean oil, etc., acetanilide, benzamide, urea, and the like, and cyclic nitrogen bases as pyrrole, indole, pyridine, quinoline, piperidine, pyrazole, naphthoquinoline, the azines, whether di-tri-ox- or thiazines. The saturated or unsaturated homologues, analogues and substitution products (e. g., containing halogen, hydroxyl and/or other substituents) of the above compounds, such as, for example, the alkylolamines, whether mono-substituted or poly-substituted, as mon-methanolamine, diethanolamine, triethanolamine, triisopropanolamine, N-ethyl-mono-propanolamine, N - phenyl - N - ethanolamine, mono- or di-ethanol-ethylene diamine, etc., may also be used, as well as quaternary ammonim bases.

Admixtures particularly effective in attaining the objects of the present invention are obtained by the reaction of organic polyhydroxy acids with alkylolamines, sometimes referred to as amino alcohols. Particularly preferred admixtures comprise the reaction products obtained by the interaction of a polyhydroxy acid having 4 through 8 carbon atoms in an open chain and having open chain alkylol radicals containing from 1 through 4 carbon atmos in each radical, such as, for example, triethanolamine, or mixtures of triethanolamine with mono- and di-ethanol amines.

In the preparation of the reaction products the reactants are mixed with stirring or with the application of any other suitable means of effecting their intimate contact. Heat may be applied when necessary to initiate, hasten or complete the course of the reaction. When the reaction is of substantially exothermic nature, as is often the case when the organic nitrogen base is an alcoholic amine, such as, for example, triethanolamine, the application of heat from an external source need not be resorted to. It has, however, been found desirable to subject the reaction product, whether obtained with the aid of externally applied heat or without it, to further heating upon the substantial completion of the reaction. Thus, the reaction products of a polyhydroxy acid and a nitrogen base are preferably subjected to an elevated temperature for a time sufficient to effect the removal of a substantial amount of moisture therefrom; complete drying is usually impractical unless a high vacuum is applied because charring or caramelization is to be avoided; however, the invention contemplates such complete drying within its scope. Temperatures in excess of about 100° C., for example in the range from about 100° C. to 250° C., are suitable for such pretreatment of the reaction product prior to incorporation in the cementitious compositions of the present invention. It was found that mixing such partially dehydrated or heat-treated products with water does not cause appreciable reversion, indicating a chemical change as a result of such heat treatment.

Preparation of the reaction product may comprise the reaction, simultaneously or consecutively, of two or more nitrogen bases with one or more polyhydroxy acids. Particularly suitable admixtures may be obtained by treatment of the polyhydroxy acid with less than the equivalent quantity of an amine, e. g., an alcohol amine, followed by treatment with ammonia gas or aqua ammonia to neutralize the remaining free acid.

The reaction products need not be neutral and an excess either of the carboxylic acid or of the nitrogen base may be used in carrying out the reaction. If an excess of the base, such as alkylol amine, is used, the reaction product may be further treated with a fatty acid to form foaming or air-entraining compounds, and resulting in a composite admixture.

Mixtures of reaction products of the type described may be employed as admixtures in the cementitious compositions. These admixtures need not necessarily consist of the reaction products in a relatively high state of purity, but may comprise compositions containing substantial amounts of such reaction products. Moreover, the admixtures may be obtained from any suitable source and the invention is not to be limited to their origin or the method of production. Thus, a reaction product of a given polyhydroxy acid and a nitrogen base may be obtained from reactions or sources other than the reactions described.

The invention is illustrated by the following examples and the chart of the drawing.

EXAMPLE I 22 parts of triethanolamine (containing minor amounts of mono- and di-ethanol amine) are added to 78 parts of 50 percent aqueous gluconic acid. The reaction is strongly exothermic. The resulting reaction product is suitable as an admixture, either alone or together with other air-entraining agents, for the purpose of the invention. This product is hereinafter referred to as product "A."

EXAMPLE II

The reaction is carried out as in Example I, but the proportions are 20 parts of triethanol amine and 80 parts of 50 percent aqueous gluconic acid; the product is designated product "B."

EXAMPLE III

Reaction product "B" is treated with a small amount, about 6 grams of ammonia gas per liter of aqueous product "B"; the ammonia is readily reacted. The product is designated product "C."

EXAMPLE IV

Reaction product "A" is heated to about 150° C. to drive off water until the solution contains about 90 percent solids; the product is designated product "D."

All of the foregoing products are suitable for use as admixtures, either alone or with other air-entraining agents; however, product "D," when used alone, entrains more air in concrete than the other products when used alone.

EXAMPLE V

A plurality of batches of concrete containing Portland cement and graded mineral aggregate in the ratio 1:6.7 by weight were mixed with water in the amount required to yield a slump of about 3.4 inches. The aggregate was of 0 to ¾ in. size, with a fineness modulus of 5.10. Various admixtures, in the proportions indicated in Table I, were added to these batches during mixing, which were molded in 3- by 6-in. cylinders and cured at standard conditions in a foggy atmosphere. Strengths were determined after 7 and 28 days; each tabulated value is the average of several samples. Results were as follows:

G was a commonly used air-entraining agent used for improving durability or weathering resistance of concrete, consisting essentially of sulphonated hydrocarbons and containing an accelerator.

H was gluconic acid; I, tartaric acid; J, citric acid; and K, monocalcium saccharate.

The data establish the better air-entraining properties and higher strengths produced by reaction product "B" in comparison with gluconic, tartaric or citric acid (H, I and J). Triethanolamine, as is well known, entrains almost no air, and does not decrease the water requirements for a given consistency of concrete.

Compared to G, regarded in the art as one of the best air-entraining agents, it is noted that B, although entraining less air, improved plasticity (permitting use of a water-cement ratio of 0.514 for a 2-percent air entrainment, the same as for a 4.3-percent air entrainment with G), and had the advantage of yielding considerably higher strengths, while the strengths obtained with G were similar to or below the strengths of the control.

It is further noted that all strengths with the composite admixtures E and F were higher than those of the control, even with air entrainment as high as 6.6 percent; by comparison G showed a considerable strength reduction when larger amounts of air were entrained.

EXAMPLE VI

To demonstrate the characteristic of the organic reaction products in aiding the action of known air entraining agents for improving workability several batches of concrete were mixed as in Example V, using the same cement and aggregate in the same ratio, containing in each instance unreacted gluconic acid and triethanolamine in amounts equal to the constituents of the reacted product in the Example V experiment wherein 0.1500 percent of F was used. i. e., 0.029 percent of triethanolamine and 0.058 percent

*Table I*

TESTS ON 3- x 6-IN. CONCRETE CYLINDERS PREPARED FROM 1:6.7 MIXTURES OF NORMAL PORTLAND CEMENT AND MINERAL AGGREGATE, FINENESS MODULUS 5.1, MAX. SIZE ¾-IN., WATER CONTENT ADJUSTED TO 3.4 IN. SLUMP

| Admixture | | Water to Cement Ratio | Unit Weight of Fresh Concrete, Lbs./cu. ft. | Entrained Air, Volume Per Cent of Fresh Concrete (Gravimetric Method) | Compressive Strength, Lbs./sq. in. | |
|---|---|---|---|---|---|---|
| Type | Amount Weight Per Cent of Cement | | | | 7 days | 28 days |
| None | 0 | 0.544 | 152.5 | 0.8 | 2,630 | 4,490 |
| B | 0.125 | 0.523 | 150.4 | 3.1 | 2,830 | 4,890 |
| B | 0.160 | 0.514 | 152.4 | 2.0 | 3,320 | 4,890 |
| E | 0.0430 | 0.526 | 150.8 | 2.8 | 2,950 | 4,750 |
| E | 0.0850 | 0.517 | 150.4 | 3.4 | 3,230 | 4,790 |
| E | 0.1700 | 0.503 | 146.9 | 5.6 | 3,090 | 4,530 |
| F | 0.0375 | 0.519 | 151.9 | 2.2 | 2,660 | 4,450 |
| F | 0.0750 | 0.508 | 150.1 | 3.5 | 2,920 | 4,580 |
| F | 0.1500 | 0.478 | 149.5 | 4.6 | 3,040 | 4,720 |
| F | 0.2250 | 0.461 | 146.6 | 6.6 | 3,130 | 4,690 |
| G | 0.0075 | 0.514 | 148.8 | 4.3 | 2,640 | 4,390 |
| G | 0.0150 | 0.508 | 146.9 | 5.6 | 2,550 | 4,090 |
| H | 0.050 | 0.523 | 152.7 | 1.6 | 2,530 | 4,510 |
| H | 0.075 | 0.520 | 152.2 | 2.0 | 2,700 | 4,530 |
| I | 0.160 | 0.549 | 152.4 | 1.3 | 2,560 | 4,220 |
| J | 0.160 | 0.549 | 152.1 | 1.5 | 2,280 | 4,030 |
| K | 0.160 | 0.538 | 151.5 | 2.1 | 2,630 | 4,460 |

In Table I, admixtures B, E and F are in accordance with the invention; others are presented for purposes of comparison.

Admixture B is product "B" of Example II; E consisted of 96 parts of product "A" and 4 parts of G; F consisted of 96 parts of product "B" and 4 parts of G.

gluconic acid. (All percentages are in percent of weight of the cement.) Different quantities of G were used to determine the amount necessary to entrain 4.6 percent of air at the same consistency. It was found that 0.0085 percent of G had to be used. This is to be compared with 0.0060 percent of G contained in the indicated experiment of Example V, showing a reduction of about 29 percent in the amount of G required when using the reaction product according to the invention as against the amount of G required when using the unreacted constituents of the reaction product in the same amounts. It has been found for several commercially used air-entraining agents that the reduction in the amount required is generally between 25 and 45 percent.

EXAMPLE VII

Several batches of concrete were mixed, molded, and cured as in Example V, using the same cement and aggregate in the same ratio, the amount of water being adjusted in each batch to produce a fresh concrete of the same workability as determined by the remolding effort, viz., a remolding effort of 21 jigs. Batch 1 was the control and contained no admixture; 0.175 percent of F was added to the mixing water in batch 2. Batches 3 and 4 each contained unreacted constituents of admixture F in the same quantities as used in batch 2, e. g., 0.0070 percent of air-entraining agent G, 0.034 percent of triethanolamine, and 0.067 percent of gluconic acid. (All percentages are in percent of weight of the cement.) In batch 3 the gluconic acid was dissolved in the mixing water, mixed with the cement and aggregate for one minute, and the other components of the admixture were then added in dilute solution and well dispersed. In batch 4 was triethanolamine and air-entraining agent G were added first, dissolved in a part of the mixing water; the gluconic acid was then added separately with further mixing water as a 5-percent aqueous solution. All batches were air-entraining agent consisting essentially of sulphonated hydrocarbons; and M was a commercial air-entraining agent consisting essentially of neutralized resins. Admixtures were added in amounts to entrain 4 percent of air. In each batch the quantity of water was selected to produce the same consistency, i. e., a slump of about 3.0 in. The compressive strengths of 6- x 12-inch cylinders, cured under standard conditions, were determined after 7 and 28 days, each determination being the average of two tests. The strength (in pounds per square inch) was, in each instance, divided by the cement content (in pounds of cement per cubic yard of concrete). The results are plotted in the accompanying drawing, which shows consistently better strength-cement content relationships for the batches containing admixture F, prepared in accordance with this invention, over a wide range of water to cement ratios.

EXAMPLE IX

To illustrate the utility of the reaction products with other types of cements and as applied to grout, four batches of grout were prepared by mixing equal parts by weight of sand (0 to No. 14, fineness modulus 1.4) and Portland-pozzolana cement (about 28 percent by wt. of pozzolana) and adding water to cause in each batch a consistency factor of 150°. One batch contained no admixture; the second contained 0.160 percent of product B, and the third and fourth contained 0.047 and 0.065 percent, respectively, of technical gluconic acid (H). Each grout was pumped into 3- x 6-in. cylinders which had previously been filled with crushed granite retained on a ¾-in.

*Table II*

TESTS ON 3- x 6-IN. CONCRETE CYLINDERS PREPARED FROM 1:6.7 MIXTURES OF NORMAL PORTLAND CEMENT AND MINERAL AGGREGATE, FINENESS MODULUS 5.1, MAX. SIZE ¾-IN., WATER CONTENT ADJUSTED TO 21-JIG REMOLDING EFFORT

| Batch | Admixture | Water to Cement Ratio | Unit Weight of Fresh Concrete, Lbs./cu. ft. | Entrained Air, Volume Per Cent of Fresh Concrete (Gravimetric Method) | Compressive Strength at 7 Days, Lbs./sq. in. |
|---|---|---|---|---|---|
| 1 | None | 0.544 | 152.5 | 0.8 | 2,630 |
| 2 | Reacted | 0.470 | 148.4 | 5.2 | 2,830 |
| 3 | Unreacted | 0.473 | 149.3 | 4.6 | 2,510 |
| 4 | do | 0.476 | 149.1 | 4.7 | 2,440 | thoroughly mixed after the complete admixtures were added. Results of compressive strength tests after 7 days are shown in Table II.

The greater air-entrainment and improved strengths obtainable from use of the reaction product in comparison to the control and to mixes containing the unreacted components of the reaction product are evident from the foregoing data.

EXAMPLE VIII

Twenty different batches of concrete containing normal Portland cement and graded mineral aggregate were mixed, the water-cement ratio being fixed for four groups of five batches as follows: 0.40, 0.50, 0.60 and 0.80. The aggregate contained sand and gravel with a maximum size of 1½ in. In each group, one batch was used as a control and contained no admixture; the remaining batches in each group contained admixtures F, G, L and M, respectively. F and G were as indicated in Example V; L was a commercial screen. The ratio of cement to sand plus granite was 1:5.2. Seven-day and 28-day strengths were determined after curing the cylinders under standard conditions. Results are shown in Table III.

*Table III*

TESTS ON 3- x 6-IN. CONCRETE CYLINDERS OF 1:5.2 MIXTURES OF PORTLAND-POZZOLANA CEMENT AND SAND-GRANITE AGGREGATE, MAX. SIZE ¾ IN., WATER CONTENT ADJUSTED TO APPROXIMATELY 150° CONSISTENCY FACTOR, PREPARED BY PUMPING GROUT INTO CYLINDERS CONTAINING COARSE AGGREGATE

| Admixture | | Water to Cement Ratio | Compressive Strength, Lbs./sq. in. | |
|---|---|---|---|---|
| Type | Amount Weight Percent of Cement | | 7-days | 28-days |
| None | 0 | 0.49 | 1,510 | 2,560 |
| B | 0.160 | 0.46 | 3,360 | 4,290 |
| H | 0.047 | 0.46 | 2,640 | 4,030 |
| H | 0.065 | 0.46 | 2,330 | 3,680 |

Another important property of cementitious mixtures is water constancy. The tendency of mixtures to bleed is expressed as water gain, and it was found that the reaction products according to the invention reduce the water gain in concrete. Water constancy is also important in grouts. From the viewpoint of the plasterer or mason, no dry material is plastic; it must be mixed with water to develop plasticity. Mortar or plaster is usually applied to a material which is more or less absorbent, resulting in water loss. The plasticity of a material depends upon its ability to hold its water against the suction of the material to which it is applied. Water constancy has, therefore, been defined as "the ability of a mortar to retain water against suction." The following example illustrates the utility of the reaction products for promoting water constancy.

EXAMPLE X

Five batches of grout were prepared as described for Example IX, containing the admixtures indicated in Table IV, and the rate of water extraction was determined for each grout. The tabulated rate of extraction is the time in minutes and seconds required to extract 60 ml. of water from 500 ml. of grout contained in a Büchner funnel on 11 cm. No. 42 Whatman filter paper, and the water being extracted under a vacuum of 28 inches of mercury.

concrete containing diatomaceous earth, eleven batches of concrete of identical workability, each having a ratio of cement (or of cement plus diatomaceous earth) to aggregate of 1:6.7, but differing from one another with respect to the amount of diatomaceous earth used as a cement replacement and as regards the agent employed in treating the earth, were used for the manufacture of 3- x 6-in. cylindrical specimens which were tested to determine their compressive strengths at various ages. One of the batches contained no diatomaceous earth or admixture of any kind and contained no entrained air; all others contained diatomaceous earth treated by grinding with various combinations of water-reducing and air-entraining agents in amount sufficient to produce 5 percent of entrained air in the concrete. In all cases and at all ages, the specimens which contained diatomaceous earth replacements which had been treated with the reaction product according to the invention together with a small quantity of any one of several commonly used air-entraining agents exhibited higher strengths than the Portland-cement concrete without addition of any kind and higher strengths than any of those containing a like quantity of diatomaceous earth and any combination of commonly employed water-reducing and air-entraining agents. Data are given in Table V.

Table V
COMPRESSIVE STRENGTH TESTS ON 3- x 6-IN. CONCRETE CYLINDERS CONTAINING DIATOMACEOUS EARTH AS REPLACEMENT FOR PORTLAND CEMENT

| Batch No. | Pounds per Cu. Yd. | | | Admixture | | Compressive Strength, Lbs./sq. in. | | Ratio of Compressive Strength (Lbs./sq. in.) to Cement (Lbs./cu. yd.) | |
|---|---|---|---|---|---|---|---|---|---|
| | Cement | Diatomite | Water | Type | Amount Weight %[1] | 7-days | 3-mos. | 7-days | 3-mos. |
| 1 | 490 | 0 | 265 | | 0 | 1,910 | 4,520 | 3.9 | 9.2 |
| 2 | 476 | 10 | 238 | F | 0.17 | 2,890 | 5,570 | 6.1 | 11.7 |
| 3 | 477 | 10 | 239 | N | 0.13 | 2,870 | 5,499 | 6.0 | 11.5 |
| 4 | 478 | 10 | 234 | P | 0.21 | 2,390 | 4,260 | 5.0 | 8.9 |
| 5 | 477 | 10 | 239 | Q | 0.21 | 2,370 | 4,760 | 5.0 | 10.0 |
| 6 | 477 | 10 | 239 | R | 0.21 | 2,330 | 4,750 | 4.9 | 10.0 |
| 7 | 459 | 29 | 234 | F | 0.17 | 3,210 | 6,050 | 7.0 | 13.2 |
| 8 | 459 | 29 | 239 | P | 0.21 | 2,460 | 4,620 | 5.4 | 10.1 |
| 9 | 445 | 39 | 241 | F | 0.17 | 2,690 | 5,730 | 6.1 | 12.8 |
| 10 | 447 | 39 | 243 | N | 0.14 | 2,910 | 6,000 | 6.5 | 13.4 |
| 11 | 447 | 39 | 238 | P | 0.21 | 2,390 | 4,940 | 5.3 | 11.1 |

[1] Percent by weight of the cement plus treated diatomaceous earth.

Table IV
RATES OF WATER EXTRACTION OF GROUTS OF 1:1 MIXTURES OF PORTLAND-POZZOLANA CEMENT AND SAND

| Admixture | | Water to Cement Ratio | Consistency Factor, degrees | Rate of Water Extraction, Min.:Sec. |
|---|---|---|---|---|
| Type | Amount Weight Percent of Cement | | | |
| None | 0 | 0.49 | 150 | 3:10 |
| B | 0.160 | 0.46 | 148 | 5:40 |
| F | 0.175 | 0.43 | 150 | 5:47 |
| H | 0.047 | 0.45 | 147 | 5:15 |
| H | 0.065 | 0.45 | 155 | 5:23 |

The foregoing data indicate the efficiency of the reaction products, both alone and with an air-entrainment agent, to achieve a low consistency factor (i. e., a high fluidity) with low water to cement ratios while producing a low rate of water extraction.

EXAMPLE XI

To test the utility of the reaction product on

Admixture F consisted of 96 parts of product B (see Example II) and 4 parts of G (a commercially available air-entraining agent consisting essentially of a sulphonated hydrocarbon, and containing an accelerator).

N consisted of 97 parts of product B and 3 parts of an alkyl-aryl sulphonate.

P was a mixture of a commercially available air-entraining agent consisting essentially of a sulphonated hydrocarbon salt, and a commercially available water-reducing agent which is a lignin sulphonic acid residue to which an accelerator was added.

Q was a mixture of a commercially available air-entraining agent consisting essentially of a mixture of the salt of a foaming resin, a water-reducing agent, and a calcium salt of lignin sulphonic acid to which an accelerator was added.

R was a mixture of lignin sulphonic acid residue, an accelerator, and an alkyl aryl sulphonate.

The batches containing admixtures F and N are those according to the invention; others are included for purposes of comparison. The data show that compressive strengths per pound of cement per cubic yard of concrete (last two columns), which is a measure of strength-producing efficiency, for batches which contained replacements of diatomaceous earth treated with agents F and N are, for the age of seven days, 54 to 79 percent greater than for batch 1 which contained no diatomite, and 25 to 45 percent greater at the age of three months. Also, for a given replacement of diatomaceous earth, the strengths are in the order of 15 to 30 percent greater for those batches containing the reaction product than for those containing combinations of conventional water-reducing and air-entraining agents.

period of time. Periodically the natural frequencies of vibration of the specimens were determined and their dynamic moduli of elasticity in terms of percentage of the modulus at the beginning of the freeze-thaw treatment. When this percentage became less than 25, the specimens were considered to have "failed," and the tests were discontinued. The trends were exactly the same for specimens which were 14 days old when the treatment was started as for those that were three months old, though the latter required a larger number of cycles to produce failure. Results are presented in Table VI.

*Table VI*

WEATHERING RESISTANCE TESTS ON 3- x 12-IN. CONCRETE CYLINDERS CONTAINING DIATOMACEOUS EARTH AS REPLACEMENT FOR PORTLAND CEMENT

| Batch No. | Pounds per Cu. Yd. | | | Admixture | | Percent of Initial Modulus at Indicated Number of Cycles | | |
|---|---|---|---|---|---|---|---|---|
| | Cement | Diatomite | Water | Type | Amount Weight Percent [1] | 60 | 100 | 150 |
| 1 | 490 | 0 | 265 | | 0 | 28 | | |
| 2 | 487 | 0 | 244 | S | | 58 | 42 | 37 |
| 3 | 476 | 10 | 238 | F | 0.17 | 76 | 74 | 70 |
| 4 | 477 | 10 | 239 | N | 0.13 | 69 | 67 | 64 |
| 5 | 478 | 10 | 234 | P | 0.21 | 52 | 49 | 46 |
| 6 | 477 | 10 | 239 | Q | 0.21 | 56 | 45 | 39 |
| 7 | 477 | 10 | 239 | R | 0.21 | 62 | 47 | 37 |
| 8 | 459 | 29 | 234 | F | 0.17 | 77 | 73 | 70 |
| 9 | 457 | 29 | 243 | N | 0.13 | 75 | 72 | 70 |
| 10 | 459 | 29 | 239 | P | 0.21 | 66 | 58 | 56 |
| 11 | 459 | 29 | 234 | Q | 0.21 | 65 | 62 | 54 |
| 12 | 459 | 29 | 234 | R | 0.21 | 64 | 52 | 49 |
| 13 | 445 | 39 | 241 | F | 0.17 | 80 | 76 | 73 |
| 14 | 447 | 39 | 243 | N | 0.14 | 82 | 76 | 71 |
| 15 | 448 | 39 | 243 | Q | 0.21 | 69 | 64 | 53 |

[1] Percent by weight of the cement plus treated diatomaceous earth.

Weathering resistance of concrete and similar mixtures is determined by subjecting specimens of the hardened product to cycles of alternate freezing and thawing under controlled conditions of temperature, time and moisture. This treatment increases the length of the specimens, decreases the strength and modulus of elasticity and, if continued for a sufficient number of cycles, produces disintegration. Good correlation has been found to exist between resistance to actual disintegration such as may take place in many hundreds of cycles and the decrease in dynamic modulus of elasticity which takes place in a relatively small number of cycles. The dynamic modulus is determined by measuring the natural frequency of vibration of the specimen with electronic equipment; knowing the density and dimensions of the specimen, its dynamic modulus of elasticity is then calculated. The following example illustrates the improved resistance to weathering effected by using the reaction products according to the invention.

EXAMPLE XII

Fifteen batches of concrete corresponding in all particulars to those described in Example XI were employed in the manufacture of 3- x 12-in. cylindrical specimens. Batch 1 contained no entrained air; all others contained 5 percent air. These were moist cured at 70° F., some to the age of 14 days and some to the age of three months and, surrounded by a thin film of water, were then subjected to cycles of alternate freezing at 0° F. and thawing at 60° F., each cycle for a fixed Admixture S was a commercial air-entraining agent consisting essentially of a sulphonated hydrocarbon salt to which an accelerator had been added. Other admixtures were as described for Example XI.

Considering the results for freezing and thawing tests started at the age of three months and continued to 150 cycles, which are shown in the last three columns of Table VI, it is seen that, for the same percentage of entrained air (5 percent) the specimens containing admixtures F and N exhibited much greater resistance to weathering action than did those with conventional air-entraining agents with or without conventional water-reducing agents, and it will also be seen that the higher the replacement of treated diatomite, the greater was the weathering resistance.

EXAMPLE XIII

Specimens of concrete comparable to those described in Example XI and XII were moist-cured for 28 days at 70° F. and were then stored in an atmosphere of 50 percent relative humidity and 70° F. Periodically their lengths were measured and their drying shrinkage was computed. In Table VII, the three-month drying shrinkage of specimens containing diatomaceous earth replacement, both untreated and treated with water-reducing and air-entraining agents, are compared with the shrinkage of corresponding specimens containing straight Portland cement, without admixture. The agents have the same designations as in Examples XI and XII. When agents were used, 5 percent of air was entrained.

Table VII

RELATIVE SHRINKAGE OF CONCRETE CONTAINING DIATOMACEOUS EARTH AS REPLACEMENT FOR PORTLAND CEMENT

| Admixture | Per cent Replacement of Portland by Diatomite | | | |
|---|---|---|---|---|
| | 0 | 2 | 4 | 8 |
| None | 100 | 104 | 108 | 113 |
| S | 110 | 111 | 108 | 112 |
| F | | 95 | 96 | 91 |
| N | | 91 | 97 | 91 |

It will be seen that by the use of admixtures F and N, containing the organic reaction product, the shrinkage was substantially less for concrete containing diatomite replacements than for the concrete containing no diatomite; for the 8 percent diatomite replacement by weight corresponding to about 12 percent by absolute volume, the shrinkage was 20 percent less when the diatomite was treated with agents F and N. The use of the conventional air-entraining agent S showed no such beneficial effect.

I claim as my invention:

1. The method of treating cementitious mixtures containing essentially a hydraulic cement to reduce the water-cement ratio required for effecting a desired workabiilty which comprises incorporating in said mixture an amount of the order of 0.005 to 0.6 percent, based on the cement content of said mixture, of the product resulting when a polyhydroxy carboxylic acid having at least four and not over 18 carbon atoms and having a terminal carboxyl group is reacted in aqueous solution with a nitrogen base.

2. The method according to claim 1 wherein the nitrogen base is an alkylamine having open chain alkyl radicals containing at least one and not over four carbon atoms in each radical.

3. The method of treating cementitious mixtures containing essentially a hydraulic cement to reduce the water-cement ratio required for effecting a desired workability which comprises incorporating in said mixture an amount between 0.005 and 0.6 percent, based on the cement content of said mixture, of the product resulting when a polyhydroxy carboxylic acid having at least four and not over eight carbon atoms and having a terminal carboxyl group is reacted in aqueous solution with an alkylamine having open chain alkyl radicals containing at least one and not over four carbon atoms in each radical.

4. The method according to claim 3 wherein the acid is gluconic acid.

5. The method according to claim 3 wherein the alkylamine is an alkylolamine.

6. The method according to claim 5 wherein the alkylolamine is triethanolamine.

7. The method of preparing cementitious mixtures which results in a reduction in the water-cement ratio required to attain a given workability in said mixture comprising the steps of preparing a mixture containing a hydraulic cement as the essential cementing ingredient, water, and between about 0.005 and 0.6 percent, based on the cement content of the mixture, of the reaction product resulting when a polyhydroxy carboxylic acid having at least four and not over 18 carbon atoms and having a terminal carboxyl group is reacted in aqueous solution with an alkylamine having open chain alkyl radicals containing at least one and not over four carbon atoms in each radical, and mixing said ingredients in the presence of air to entrain air in said mixture.

8. The method according to claim 7, wherein the said mixture contains an air-entraining agent other than said product.

9. The method according to claim 8 wherein the air-entraining agent is a sulphonated hydrocarbon.

10. The method of treating concrete containing a hydraulic cement as the essential cementing ingredient to improve the workability of the concrete and reduce the cement content required to effect a given strength which comprises incorporating therein diatomaceous earth in amount between about two and 20 percent, based on the cement content of the concrete, and an amount between about 0.005 and 0.6 percent, based on the combined cement and diatomaceous earth content of the concrete, of the product resulting when a polyhydroxy carboxylic acid having at least four and not over 18 carbon atoms and having a terminal carboxyl group is reacted in aqueous solution with a nitrogen base.

11. The method according to claim 10 wherein the acid is gluconic acid and the nitrogen base is triethanolamine.

12. The method of preparing cementitious mixtures which results in a reduction in the drying shrinkage and an improvement in the resistance thereof to freezing and thawing and an increase in the strength of the hardened product resulting therefrom, which comprises preparing a mixture containing a hydraulic cement as the essential cementing ingredient, water, diatomaceous earth in amount between about two and 20 percent, based on the cement content of the mixture, between about 0.005 and 0.6 percent, based on the combined cement and diatomaceous earth content of the mixture, of the product that results when a polyhydroxy carboxylic acid having at least four and not over eight carbon atoms and having a terminal carboxylic group is reacted in aqueous solution with an alkylamine having open chain alkyl radicals containing at least one and not over four carbon atoms in each radical, and an air-entraining agent, and mixing said ingredients in the presence of air to entrain air in said mixture.

13. The method of preparing cementitious mixtures which comprises forming a mixture containing water, a hydraulic cement as the essential cementing ingredient, and between 0.005 and 0.6 percent, based on the cement content of said mixture, of the product resulting when gluconic acid is reacted in aqueous solution with triethanolamine.

14. The method of treating cementitious mixtures containing essentially a hydraulic cement which comprises mixing together said hydraulic cement, aggregate and water in the presence of between 0.005 and 0.6 percent, based on the cement content of the mixture, of the product that results when an alkylolamine having open chain alkylol radicals containing at least one and not over four carbon atoms in each radical is reacted in aqueous solution first with less than its equivalent of a polyhydroxy carboxylic acid having at least four and not over eight carbon atoms and having a terminal carboxyl group and thereafter with an excess of a fatty acid.

15. The method of treating cementitious mixtures containing essentially a hydraulic cement to reduce the water-cement ratio required for effecting a desired workability which comprises incorporating in said mixture between about 0.005 and 0.6 percent, based on the cement content of said mixture, of the product resulting from drying to a concentration above about 90 percent at a temperature above 100° C. the aqueous solution obtained by reacting a polyhydroxy carboxylic acid having at least four and not over 18 carbon atoms and having a terminal carboxyl group in aqueous solution with an alkylolamine.

16. A process of construction wherein a solid mass is solidified in void spaces comprising the steps of forming a grout containing hydraulic cement as the essential cementing ingredient, sand of small size, water, and an amount between about 0.005 and 0.6 percent, based on the cement content of the grout, of the product that results when a polyhydroxy carboxylic acid having at least four and not over 18 carbon atoms and having a terminal carboxyl group is reacted in aqueous solution with an alkylolamine having open chain alkylol radicals containing at least one and not over four carbon atoms in each radical, mixing said ingredients, forcing the resulting grout into said void spaces, and allowing said grout to solidify.

17. A method of preparing cementitious mixtures which comprises incorporating in diatomaceous earth a minor proportion of the product that results when a polyhydroxy carboxylic acid having at least four and not over eight carbon atoms and containing a terminal carboxyl group is reacted in aqueous solution with an alkylamine having open chain alkyl radicals containing at least one and not over four carbon atoms in each radical to produce a treated diatomaceous earth, and forming a cementitious mixture containing a hydraulic cement as an essential cementing ingredient by mixing said treated diatomaceous earth with said hydraulic cement and water in the presence of air to entrain air therein, said diatomaceous earth being present in amount between about two and 20 percent of the cement content of the said mixture and the amount of said product in the treated diatomaceous earth being such as to occur in the said mixture in amount between about 0.005 and 0.6 percent, based on the combined cement and diatomaceous earth content.

18. A cementitious mixture containing essentially a hydraulic cement and an amount of the order of 0.005 to 0.6 percent, based on the cement content of said mixture, of the product resulting when a polyhydroxy carboxylic acid having at least four and not over 18 carbon atoms and having a terminal carboxyl group is reacted in aqueous solution with a nitrogen base, said mixture having a better workability and yielding a final hardened mass with a higher strength than a mixture of like composition prepared without said product.

19. A cementitious mixture according to claim 18 wherein the carboxylic acid contains not over eight carbon atoms and the nitrogen base is an alkylamine having open chain alkyl radicals containing at least one and not over four carbon atoms in each radical.

20. A cementitious mixture according to claim 19 wherein the nitrogen base is an alkylolamine.

21. A cementitious mixture according to claim 20 wherein the carboxylic acid is gluconic acid and the nitrogen base is triethanolamine.

22. A cementitious mixture containing essentially a hydraulic cement, entrained air, between about 0.005 and 0.6 percent, based on the cement content of said mixture, of the product resulting when a polyhydroxy carboxylic acid having at least four and not over 18 carbon atoms and having a terminal carboxyl group is reacted in aqueous solution with a nitrogen base, and an air-entraining agent other than said product, said mixture having at least the same content of entrained air as and a greater strength for a like entrained air content than a mixture of like composition prepared without said product.

23. A cementitious mixture containing essentially a hydraulic cement and an amount between about 0.005 and 0.6 percent, based on the cement content of said mixture, of the product resulting when a polyhydroxy carboxylic acid having at least four and not over 18 carbon atoms and having a terminal carboxyl group is reacted in aqueous solution with an alkylamine and the resulting aqueous solution is dried to a concentration above 90 percent at a temperature above 100° C.

24. A cementitious mixture containing essentially a hydraulic cement, diatomaceous earth in an amount between about two and 20 percent, based on the cement content of said mixture, and between about 0.005 and 0.6 percent, based on the combined cement and diatomaceous earth content of said mixture, of the product resulting when a polyhydroxy carboxylic acid having at least four and not over 18 carbon atoms and having a terminal carboxyl group is reacted in aqueous solution with a nitrogen base.

25. The mixture according to claim 24 wherein the carboxylic acid contains not over eight carbon atoms and the nitrogen base is an alkylolamine having open chain alkylol radicals containing at least one and not over four carbon atoms.

26. A cementitious mixture containing essentially a hydraulic cement, entrained air, diatomaceous earth in an amount between about two and 20 percent, based on the cement content of said mixture, between about 0.005 and 0.6 percent, based on the combined cement and diatomaceous earth content of said mixture, of the product resulting when a polyhydroxy carboxylic acid having at least four and not over eight carbon atoms and having a terminal carboxyl group is reacted in aqueous solution with an alkylamine having open chain alkyl radicals containing at least one and not over four carbon atoms in each radical, and an air-entraining agent other than said product.

27. A composition for filling fine voids and interstices of porous masses of earth, rock, concrete and the like, comprising a hydraulic cement as the essential cementing ingredient, a finely divided filler, and an amount between about 0.005 and 0.6 percent, based on the cement content of said composition, of the product resulting when a polyhydroxy carboxylic acid having at least four and not over eight carbon atoms and having a terminal carboxyl group is reacted in aqueous solution with an alkylolamine, all ingredients of said composition being finely divided so that when mixed with water the material is capable of flowing freely under pressure through fine voids and interstices.

ALEXANDER KLEIN.

(References on following page)

REFERENCES CITED

The following references are of record in the file of this patent:

UNITED STATES PATENTS

| Number | Name | Date |
|---|---|---|
| 2,031,621 | Tucker | Feb. 25, 1936 |
| 2,127,451 | Scripture | Aug. 16, 1938 |
| 2,174,051 | Winkler | Sept. 26, 1939 |
| 2,243,501 | Daimler | May 27, 1941 |
| 2,360,518 | Scripture | Oct. 17, 1944 |

FOREIGN PATENTS

| Number | Country | Date |
|---|---|---|
| 466,229 | Great Britain | of 1937 |